3,340,013
FLAME DETECTOR
Terrence B. Rooney, Walpole, and Willard W. Rice, Jr., Foxboro, Mass., assignors to The Foxboro Company, Foxboro, Mass., a corporation of Massachusetts
Filed Sept. 9, 1963, Ser. No. 307,522
2 Claims. (Cl. 23—254)

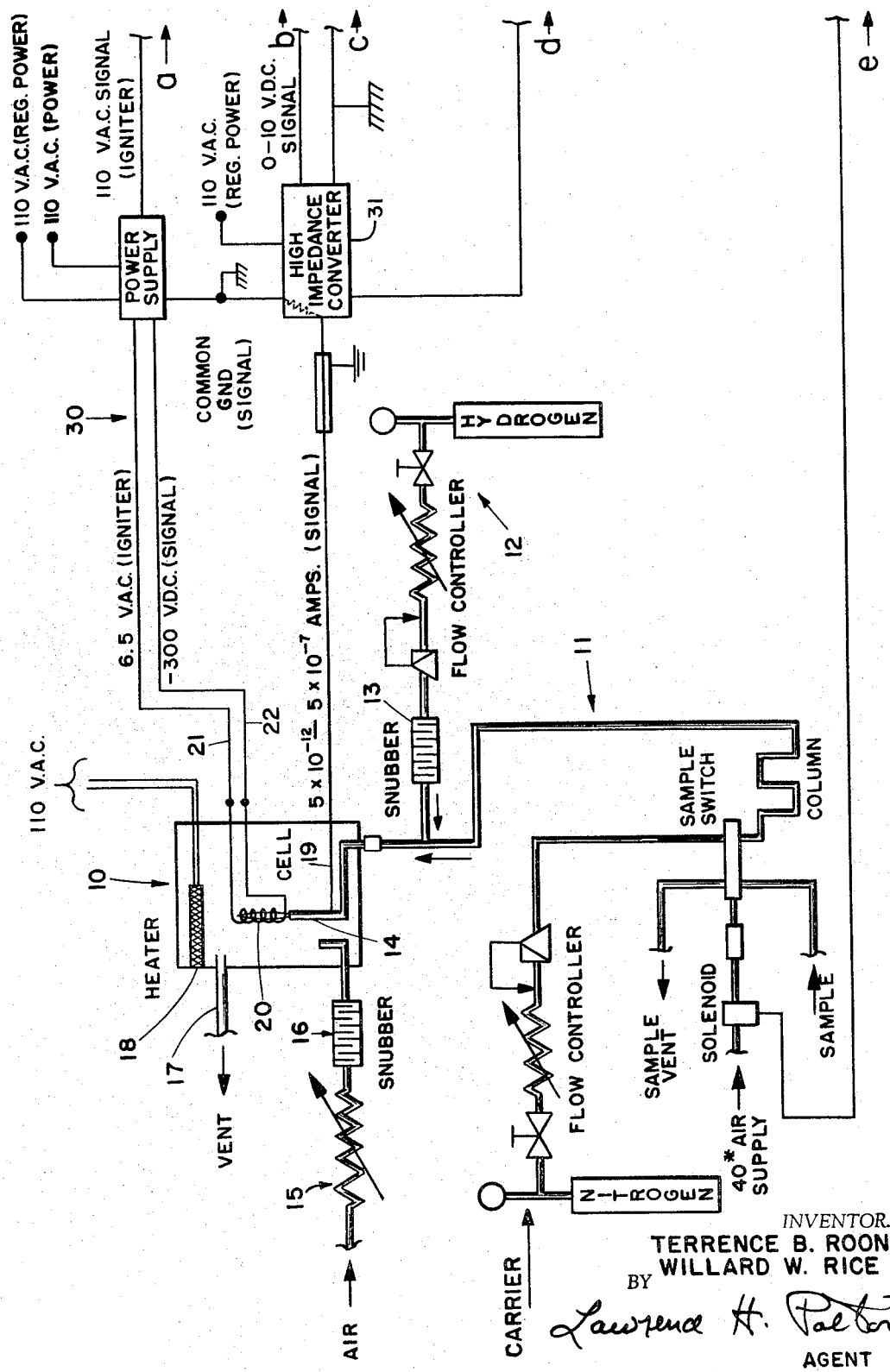
FIG. Ia

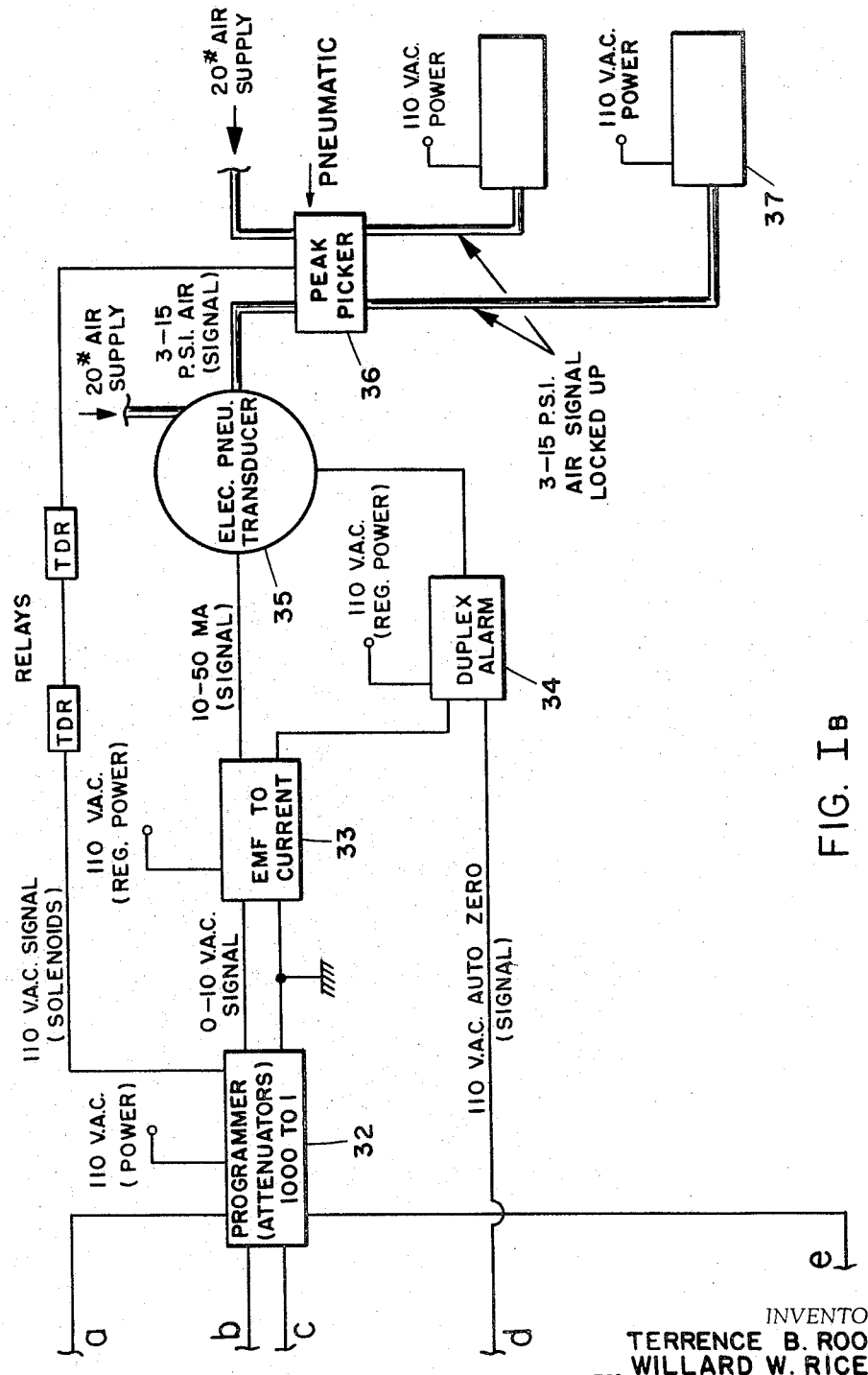
FIG. IB

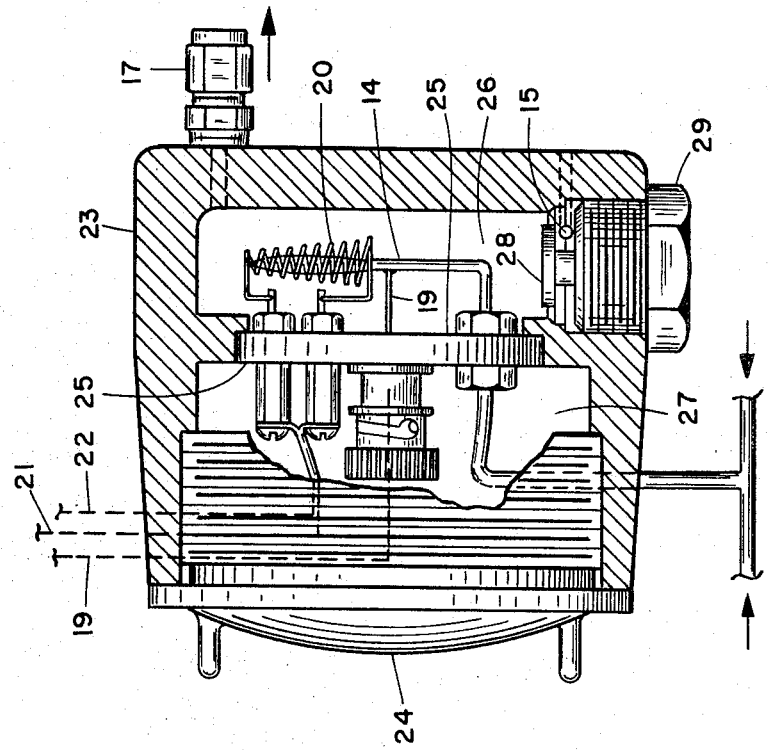
FIG. II
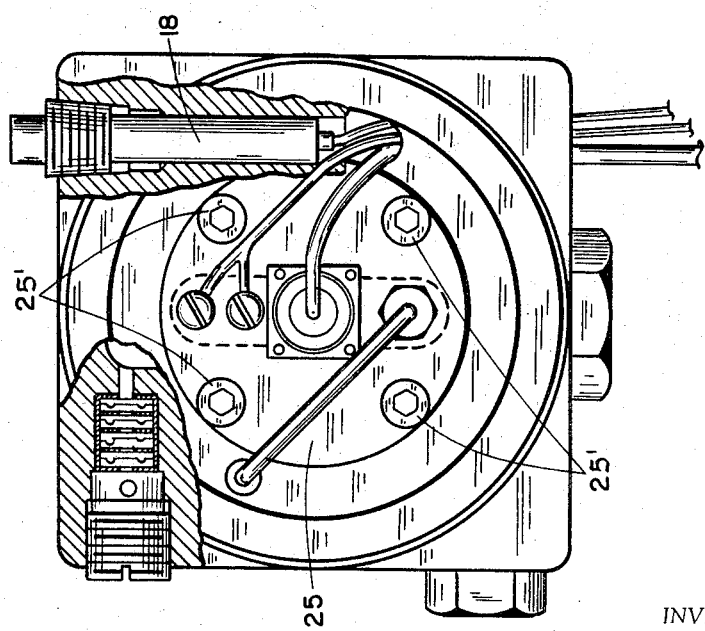
FIG. III
INVENTOR.
TERRENCE B. ROONEY
BY WILLARD W. RICE JR.
AGENT United States Patent Office 3,340,013
Patented Sept. 5, 1967

ABSTRACT OF THE DISCLOSURE

The invention is directed to the combination of a flame igniter and a measurement electrode as a single electrical component within a flame ionization detector.

---

This invention relates to flame detectors and has provided an illustration of a chromatographic flame detector.

This is a flame ionization detector and it is particularly useful where trace analysis is required. Concentrations as low as one part per million can be measured. The device of this invention is contained in its own explosionproof housing.

The flame ionization detector may use a small flame produced by the combustion of hydrogen in the presence of oxygen.

It can operate on the basis of the difference between the number of ions present in a clean $H_2$–$O_2$ flame and the greatly increased number present when a combustible carbon-containing compound is added to the flame. An electrode in close proximity to the flame collects the ions and produces an electrical output. This output is at a very high impedance and an impedance matching amplifier is used to condition the signal for readout purposes.

This invention has provision for ignition of the flame, at periodic intervals if desired by suitable switching circuitry. It preferably uses a high impedance amplifier to pick up the signal from the flame detector. A duplex alarm may be used to drive a motor connected to the amplifier to re-adjust the zero of the system.

This hydrogen flame detection system will measure and record the concentration of components appearing in the effluent of a gas chromatograph. The system consists of an explosionproof detector and a readout which may be located up to 200-ft. from the detector. The readout consists of a 300 volt power supply, a high impedance converter, an automatic zeroing mechanism, an electro-pneumatic transducer, a pneumatic peak picker and a programmer.

The column effluent is pre-mixed with hydrogen and burned at the detector jet. Any hydrocarbon present in the stream produces an ionization current proportional to its concentration.

The ionization current may be converted to a voltage signal by the high impedance converter. This signal may be attenuated in the programmer and thereafter an electro-pneumatc transducer may convert it to a 3–15 p.s.i. pneumatic signal. The maximum deflection for any component may be locked in peak picker and recorded in a pneumatic device in the form of a trend record.

It is therefore an object of this invention to provide a new and useful flame detector.

Other objects and advantages of this invention will be in part apparent and in part pointed out hereinafter and in the accompanying drawings, wherein:

FIGURES Ia and Ib together provide an overall schematic of a system according to this invention;

FIGURE II is a central cross-section of an explosionproof housing containing a flame detector unit, according to this invention; and FIGURE III is a view of the device of FIGURE II, from the bottom as shown, and with the cover removed.

FIGURES Ia and Ib taken together as through connecting leads a, b, c, d and e in the drawings illustrate an example of an overall system according to this invention.

A part of this system is indicated in FIGURE Ia in the upper left at 10 as the explosionproof flame detector unit. A structure also illustrating this detector unit is illustrated in FIGURES II and III.

The chromatographic system leading to the detector unit 10 is indicated in FIGURE Ia at the lower left at 11 and comprises, as is indicated, the chromatographic column, preceded by a sample switch which is fed by a nitrogen carrier and a sample, and which is operated by aid of an air supply.

Further, leading to the detector unit 10, there is a hydrogen supply 12 operating through an explosionproof snubber 13 shown schematically in FIG. 1a as a series of explosion or flame retarding baffles, so that from the units 11 and 12 a mixture of hydrogen and effluent from the chromatographic column is applied to the detector cell through a jet nozzle 14 within the explosionproof housing of the cell.

The cell 10 is also supplied with air for combustion, as indicated, through the system 15 through another explosionproof snubber 16 shown schematically in FIG. Ia as a series of explosion or flame retarding baffles. The cell is provided with a vent 17, and a heater unit 18 to maintain the overall cell unit at a desirable operating temperature.

Within the explosionproof detector cell the jet 14 is provided as one of the flame electrodes with an electrical signal outlet connection as at 19. Another electrode 20 is within the cell and is in the form of a coil which surrounds the flame and is essentially coextensive therewith. As indicated in FIGURE II, this coil may be conically tapered from the jet output somewhat in the shape of a flame itself, that is, somewhat large at the bottom and tapered at the top, considering the jet end as the bottom and the outer end of the flame as the top.

The electrode 20 is thus in a position to cover the overall flame and make the best possible use of the electrical current which may pass through the flame as an indication of the presence of a particular gas in the column effluent.

The electrode 20 being in the form of a coil has electrical connections at both ends as at 21 and 22. In the operation of the system when the electrode 20 is being used as an electrode only, the connection 22 is made on the negative terminal of a 300 volt supply. However, a feature of this device is the use of the coil 20 as an igniter as well as an electrode. When it is used as an igniter, the electrical connection 21 is also made and suitable switching is accomplished in the system to provide a six volt supply to ignite the flame from the jet 14 within the explosionproof housing.

This is a factor of note in an explosionproof device since in the first place it is difficult to get at the inside of such a housing to ignite a flame, and it is difficult to provide a sensing device which will determine whether or not the flame is still operating. This system may use suitable switching circuitry from the programmer 32 for automatically changing the coil 20 from its electrode status to that of an igniter at the end of each chromatographic cycle, in case the flame has gone out. This flame might be put out by a surge of variant in the gas or liquid in the gas or whatever reason, and then would be automatically reignited by this device through the programmer 32 before the start-up of any new cycle. The coil 20 also is useful as a start-up igniter. It is thought that this heating for ignition has a tendency to keep the electrode clean and the close proximity of the coil to the flame not only gives instant starts which keep the whole housing from filling with flammable material, but its close proximity to the flame aids the measurement when it is used as an electrode.

As may be seen in FIGURE II, the explosionproof housing comprises a main body 23, with a threaded cap 24 at one end thereof. Within the housing there is an electrical insulated mounting plate 25 which defines an operating chamber 26 with the base of the housing and an access chamber 27. This mounting plate 25 is secured to the device by bolts as indicated in FIGURE III at 25′.

The detector is explosionproof through the substantially walled structure shown in FIGURE II, enclosing the flame area essentially defined by the electrode 20.

Accordingly, when it does become necessary to disassemble the explosionproof housing the cap 24 may be removed and the mounting plate 25 may easily be removed and along with it both of the electrodes. Thus, the whole operating portion of the detector may be easily removed from the device for inspection, repair, or replacement.

Note in FIGURE II that the air inlet to the unit as through the system 15, so as not to disturb the flame, is brought in under a diffusion plate 28 which is a part of an air diffusion plug 29 set in for that purpose. The air comes in through the system 15 and swirls around under the bottom face of the diffusion plate 28 and then up to the flame chamber.

Referring again to FIGURES Ia and Ib taken together, an electrical system is provided for the operation of the coil 20, with suitable switching arrangements (not shown) for changing the coil 20 from an electrode to an igniter. This electrical system is generally indicated at 30.

The output of the cell through the electrical connector 19 is applied to a high impedance converter amplifier 31, the input impedance thereof constituting the return path to ground (i.e., to the positive terminal of the 300 volt supply), and which includes a zeroing motor which may be adjusted automatically after each cycle as needed to reset the zero of the device automatically. The output of the amplifier 31 is applied to a programmer 32 and from there to an EMF to current transmitter 33. This in turn applies a signal to a duplex alarm 34 for zeroing purposes, and to another transducer 35, for changing the signal from electrical to pneumatic state.

The output of the transducer 35 is applied to the pneumatic peak picker 36 to provide a pneumatic signal for application to a recorder 37.

This invention therefore provides a new and useful chromatographic flame detector system.

As many embodiments may be made in the above invention and as changes may be made in the embodiments set forth above without departing from the scope of the invention, it is to be understood that all matter hereinbefore set forth or shown in the accompanying drawings, is to be interpreted as illustrative only and not in a limiting sense.

We claim:
1. A flame ionization detector for determining trace hydrocarbon content in a gas mixture further mixed with hydrogen gas and burned in the presence of oxygen within a chamber in said detector comprising,
a housing having a recess therein,
a mounting member adapted to closely fit with said housing to form an enclosed chamber with said recess,
a first gas conduit bringing said gas mixture mixed with hydrogen gas through said mounting member into said chamber and being sealably fixed to said member,
a jet nozzle terminating said first conduit within said chamber for expelling said gas mixture mixed with hydrogen gas into said chamber and said jet nozzle comprising a first electrode,
a second gas conduit for introducing a gas containing oxygen into said chamber so as to support combustion of said gas expelled from said jet nozzle,
a second electrode positioned in said chamber in proximity with the combustion area at the exit of said nozzle and being in the form of a coil mounted to said mounting member by conductors connecting with both ends of said coil with said conductors leading through said mounting member and being electrically insulated therefrom with said coil having an electrical resistance,
a source of electrical energy selectively supplied by means of said conductors to said coil for heating said coil to a temperature sufficient to initiate combustion of said hydrogen gas mixed with said gas mixture, which combustion is supported by said gas containing oxygen, and
an electrical circuit including said first and second electrodes for measuring the electrical conductivity therebetween affected by the presence of hydrocarbons in said gas mixture thereby providing an indication of a hydrocarbon content of said gas mixture.
2. The flame ionization detector of claim 1 with flame retardation means in series with said first and second conduits.

References Cited
UNITED STATES PATENTS

| | | | |
|---|---|---|---|
| 1,686,051 | 10/1928 | Weber | 48—192 XR |
| 2,931,431 | 4/1960 | Iager et al. | 317—87 XR |
| 3,027,241 | 3/1962 | Andreatch et al. | 23—232 |
| 3,086,848 | 4/1963 | Reinecke | 23—254 |
| 3,200,011 | 8/1965 | Baker | 23—254 XR |
| 3,215,499 | 11/1965 | Dewar et al. | 23—232 XR |

MORRIS O. WOLK, *Primary Examiner.*

R. M. REESE, *Assistant Examiner.*